US 6,701,056 B2

(12) United States Patent
Burek et al.

(10) Patent No.: US 6,701,056 B2
(45) Date of Patent: Mar. 2, 2004

(54) MODULAR, VARIABLY CONFIGURABLE RETAINER ASSEMBLY FOR OPTICAL COMPONENTS

(75) Inventors: Denis Edward Burek, Cumming, GA (US); George Edwin Mock, Duluth, GA (US)

(73) Assignee: Wavesplitter Technologies, Inc., Fremont, CA (US)

( * ) Notice: Subject to any disclaimer, the term of this patent is extended or adjusted under 35 U.S.C. 154(b) by 0 days.

(21) Appl. No.: 10/038,486

(22) Filed: Jan. 2, 2002

(65) Prior Publication Data

US 2003/0123834 A1 Jul. 3, 2003

(51) Int. Cl.$^7$ ............................................. G02B 6/00
(52) U.S. Cl. ................................................ 385/137
(58) Field of Search ............................. 385/135, 136, 385/137, 134

(56) References Cited

U.S. PATENT DOCUMENTS

| | | | | |
|---|---|---|---|---|
| 5,146,532 A | * | 9/1992 | Hodge | 385/136 |
| 5,530,786 A | * | 6/1996 | Radliff et al. | 385/136 |
| 5,613,029 A | * | 3/1997 | Burek et al. | 385/135 |
| 5,835,657 A | * | 11/1998 | Suarez et al. | 385/135 |
| 6,009,224 A | * | 12/1999 | Allen | 385/135 |
| 6,249,636 B1 | * | 6/2001 | Daoud | 385/137 |
| 6,353,697 B1 | * | 3/2002 | Daoud | 385/136 |
| 6,504,986 B1 | * | 1/2003 | Wambeke et al. | 385/134 |

* cited by examiner

*Primary Examiner*—Tulsidas Patel
(74) *Attorney, Agent, or Firm*—Mayer Fortkort & Williams, PC; Stuart H. Mayer, Esq.

(57) ABSTRACT

A variably configurable and modular retainer for various discrete optical components (such as passive optical elements and mass fusion splices) is provided by a substantially planar base having an optical component support surface. Complementary finger pairs extend upwardly from the base. Each finger is disposed in an opposing arrangement with the other finger in the finger pair and is provided with an inner and outer surface. The respective opposing inner surfaces (each having a slightly concave profile) define an optical component receiving area that is sized and shaped to accommodate an optical component or splice. Each finger pair is resilient and laterally biased with a normal bias such that the inner surfaces are urged laterally inwardly and being movably outwardly for interlockingly engaging an optical component using snap-fit. The optical component may be thereby retained against the support surface of the base.

42 Claims, 10 Drawing Sheets

FIG 7

MODULAR, VARIABLY CONFIGURABLE RETAINER ASSEMBLY FOR OPTICAL COMPONENTS

BACKGROUND OF THE INVENTION

This invention relates to optical components and systems, and more particularly, to a modular, variably configurable retainer assembly for optical components.

Discrete optical components, such as couplers, isolators, combiners and wavelength division multiplexers ("WDMs") are often interconnected to create optical circuits used to create a variety of functionalities provided by optical modules including multiplexers, demultiplexers, interleavers, deinterleavers, splitter arrays and the like. Optical fibers are typically utilized to provide the multiple optical paths among such components in the optical module. A number of mass fusion splices (that may include relatively high fiber counts) may also be necessary to implement the optical circuit which may include dozens of separate optical pathways. An optical module is typically embodied in a package that organizes and locates the optical components in an appropriate spatial relationship to effectuate the optical circuit while simultaneously affording physical protection to the optical components, fibers and splices. Such packages include various holders, trays or retainers that are populated with the optical components and mass fusion splices during the manufacturing buildup of the optical module. Typically, the holders, retainers, and trays (collectively referred to simply as "holders") are then subsequently placed in an enclosure that houses and provides the exterior surfaces of the optical module. Optical cables or ribbons (i.e., pigtails) that may include connectors typically terminate the primary optical fibers and are then run outside the enclosure to provide access to the internal optical pathways.

Holders for optical components and splices in the prior art include those employing (alone or in various combinations) mechanical, adhesive, and magnetic retention solutions. Mechanical solutions include, for example, resilient foam to surround the optical components and splices, and press-fit and loose-fitting arrangements employing plastic retainers. Adhesives, such as glue and epoxy, have also been used to bond optical components and splices to the holder in the desired configuration. Optical components and splices may also be located in a holder using magnetic strips that are respectively affixed to the elements and holder. Some holder arrangements in the prior art, such as trays, require the use of a separate cover element to fully implement the required retention and/or protection of the optical components and splices.

Unfortunately, few prior art holders have proven to be entirely satisfactory. Disadvantages associated with such prior art holders include lack of precision in locating optical components and splices (foam, loose-fit), reduced physical protection (foam, loose fit), and reduced manufacturing flexibility in building up the optical module (adhesive), organizing the optical components and splices therein (adhesive), or configuring the holders themselves (all prior art solutions). Some holders in the prior art, for example, the adhesive and magnetic arrangements (and those requiring covers) also add undesirable extra manufacturing complexity, duration, and expense.

SUMMARY OF THE INVENTION

A variably configurable and modular retainer for various discrete optical components (such as passive optical elements and mass fusion splices) is provided by a substantially planar base having an optical component support surface. Complementary finger pairs extend upwardly from the base. Each finger is disposed in an opposing arrangement with the other finger in the finger pair and is provided with an inner and outer surface. The respective opposing inner surfaces (each having a slightly concave profile) define an optical component receiving area that is sized and shaped to accommodate an optical component or splice. Each finger pair is resilient and laterally biased with a normal bias such that the inner surfaces are urged laterally inwardly and being moveably outwardly for interlockingly engaging an optical component using a snap-fit. The optical component may be thereby retained substantially against the support surface of the base.

In an embodiment of the invention, side structures are disposed adjacent to the base that include one or more connective elements that form a selectively engagable interconnection with a complementary connective element on an adjacent retainer in a modular retainer assembly. The invention thus provides a modular retainer assembly (comprising a plurality of modular retainers) that may be arranged in a variably configurable planar array.

One portion of the connective element may comprise a male side structure including an resilient interlocking tab extending laterally from the male side structure. The other portion of the connective element may comprise an opposing female side structure that includes a mating slot arranged to mate with an interlocking tab of an adjacent retainer. A matching lug and recess, disposed respectively in the adjoining connective slot and tab, may be used to provide vertical registration of the side structures of the adjacent modular retainers to ensure substantial co-planarity of the assembled planar array. The interlocking tab and slot are slidably engaged along a vertical plane until the lug fits into the recess to thereby provide a snap-fit registration.

In another embodiment of the invention, the modular retainer assembly further includes an interconnector having first and second members each having complementary-shaped facing portions therewith. The first member is resilient and projects downward from the base. The second member is disposed on the base or side structures of the modular retainer. The complementary members thereby form a selectively engagable interconnection with an adjacent stacked modular retainer. The invention thus provides a stackable modular retainer that facilitates the assembly of the modular retainers into variably configurable columnar arrays.

The interconnector members may comprise a complementary hook and catch. The hook projects from the bottom of the retainer base with the opening of the hook projecting laterally inward with a normally inward bias. The catch is disposed on a top surface of the retainer with a lateral outward projection so as to receive the hook from a stacked modular retainer. The hook and catch are slidably engaged along a vertical plane as the adjacent modular retainer is placed to form the columnar stack. The hook deflects outwardly during the slidable engagement until it deflects past the lateral projection of the catch to thereby hold the catch in a snap-fit engagement.

The complementary finger pairs may be shaped to retain optical components with a substantially cylindrical cross sections or may be shaped to retain elements having an oval cross section such as mass fusion splices. The complementary finger pairs are arranged in a substantially rectangular and uniform grid having multiple rows and columns (in plan view) to thereby accommodate the retention of a plurality of optical components or splices in a spatial orientation that facilitates the interconnection of those elements to form an optical circuit. The placement of optical components and splices within the rows and columns of finger pairs may thus be variably configured according to the specific optical circuit being implemented, and additional retainers may be added in planar or columnar fashion to create a modular retainer matrix to implement other retention configurations as required by the application.

In various aspects of the invention, an injection-molded thermoplastic resin (such as polycarbonate) is used to form the modular retainer as a single unitary (i.e., monolithic) body. Optical fiber pathways may be molded into the top surface of the base to provide spaces within the modular retainer to accommodate the connective optical fibers used in an optical circuit. Modular retainers may be arranged to accommodate solely optical components (where the optical components are relatively small and consequently more may be accommodated by the modular retainer), or solely mass fusion splices (where the mass fusion splices are relatively large and consequently fewer may be accommodated by the modular retainer), or a combination of both optical components and mass fusion splices. However, in each such case, the modular retainers are sized to have a common footprint. In addition, the modular mass fusion splice retainer may be provided with a height that is an integer multiple of the height of the modular optical component retainer (e.g., two time as high), to facilitate the straightforward construction of optical modules from a mix of optical component and splice modular retainers. The side structures of the modular retainer may be positioned on the base and sized to be of equal height to the upward projecting finger pairs so that overall profile of the retainer is approximately the same size as the optical component or mass fusion splice.

The present invention provides many desirable advantages, features and benefits. The grid of complementary finger pairs creates a retention platform that provides great flexibility in laying out and building up optical modules. The snap-fit retention of the optical components and splices in the modular retainer affords precise registration of the elements with the desired spatial orientation without the use of an additional cover. The optical components may simply be pressed into place in the modular retainer by hand with low force and without any specials tools, or may be populated using conventional component insertion machines (such as pick and place machines). The slightly concave shape and resilient construction of the fingers further provides secure retention of the optical component or splice and enhanced physical protection of those elements which is augmented by the projection of the side structures to a height that is co-extensive with that of the upwardly projected finger pairs.

The interconnection feature of the invention allows any number of modular retainers to be simply and quickly snapped together, with low insertion forces and without specials tools, along their edges to form a structurally rigid planar array, or stacked top to bottom in a columnar array, or configured in a mixed planar and columnar matrix. The common footprint for all modular retainers advantageously allows mass fusion splices to be conveniently interspersed within the modular retainer matrix as necessary to realize the desired optical circuit.

DETAILED DESCRIPTION

Figure 1:
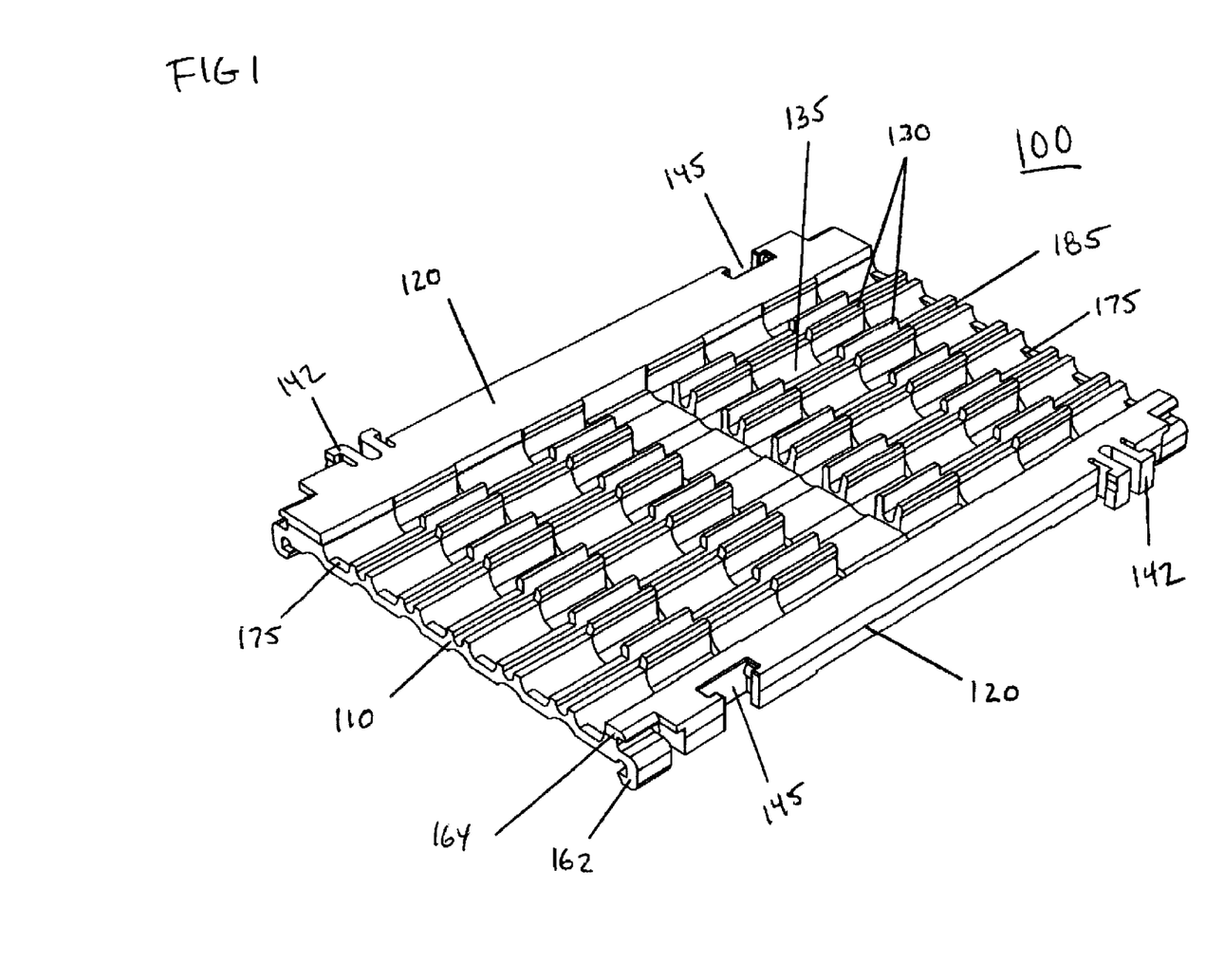
FIG. 1 is a pictorial view of a modular, variably configurable retainer for optical components, in accordance with the invention.

Turning now to the figures, FIG. 1 is a pictorial view of an illustrative example of a modular, variably configurable retainer for optical components arranged in accordance with the invention. A modular retainer 100 includes a base 110, side structures 120 including mating male and female side structures 142 and 145, an interconnect having complementary-shaped members 162 and 164, and a plurality of finger pairs 130 that extend upwardly from the base 110. The base 110 is substantially planar and rectangular in plan in this illustrative example, and includes surfaces 135 that are configured to support optical components (not shown in FIG. 1) having relatively small form factors. Disposed at the axial ends of the base on the extreme edges of each of the support surfaces 135 are a plurality of stops 175 that prevent substantial axial movement of optical components within the modular retainer 100.

Figure 2:
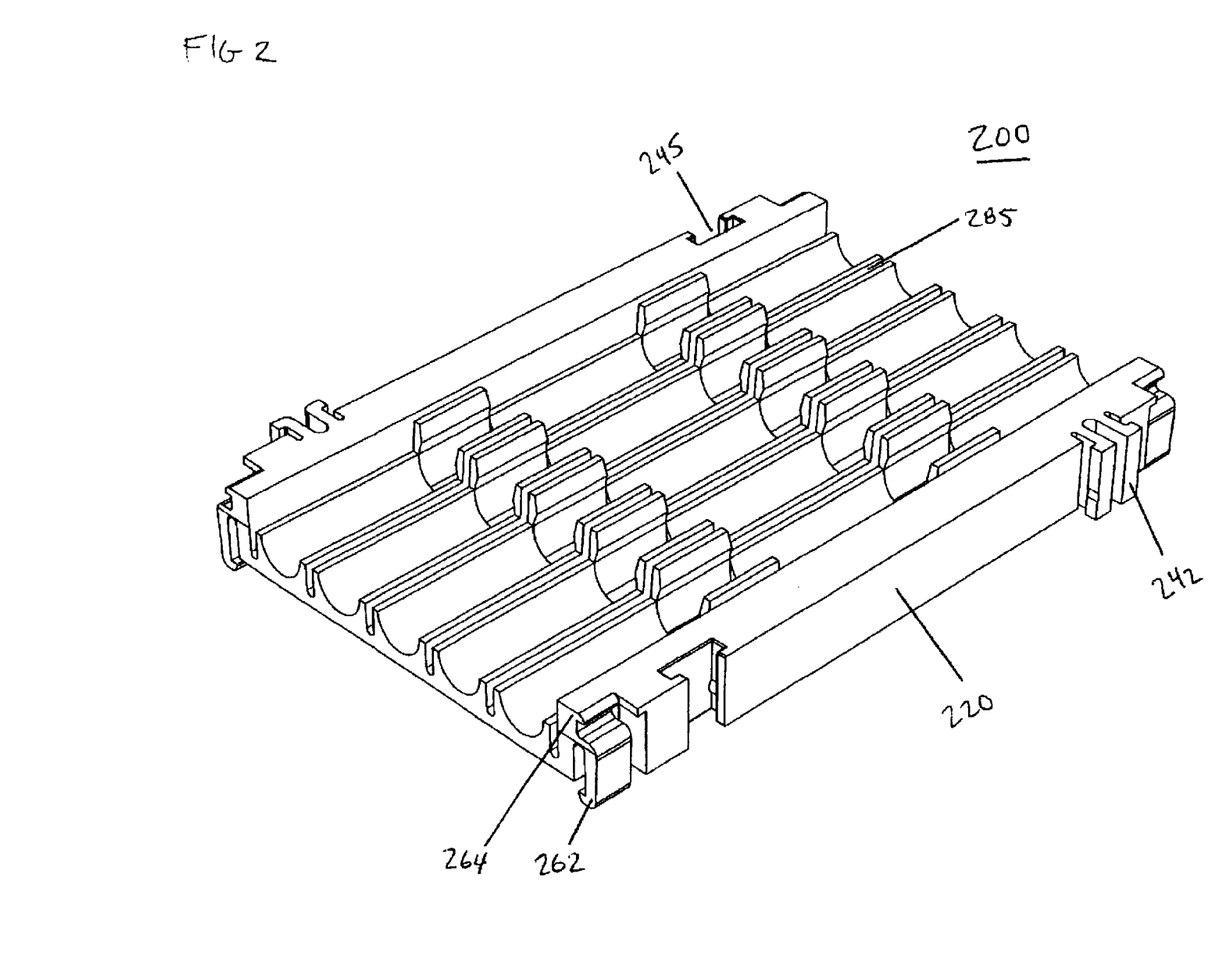
FIG. 2 is a pictorial view of a modular, variably configurable retainer for mass fusion splices, in accordance with the invention.

FIG. 2 is a pictorial view of an illustrative example of a modular, variably configurable retainer for optical components having relatively larger form factor compared to those retained by modular retainer 100. Modular retainer 200 includes a base 210, side structures 220 including mating male and female side structures 242 and 245, an interconnect having complementary-shaped members 262 and 264, and a plurality of finger pairs 230 that extend upwardly from the base 110. In applications of the invention, it may be desirable to configure the modular retainer 200 with a height that in an integer multiple of the height of the modular retainer 100. For example, the modular retainer 200 may be twice as high as modular retainer 100. This height relationship facilitates the straightforward interconnection of a variable mix of retainers 100 and 200. It is noted that for most part, with the notable exception of size, that the modular retainers 100 and 200 are quite similar in form and features and in operation.

Thus, for the sake of simplicity in the exposition that follows, features and operations that are described for modular retainer 100 should be assumed by the reader to be equally applicable to modular retainer 200, unless otherwise noted.

The optical components may be selected from a variety of conventional components including, for example, couplers, mass fusion splices, isolators, wavelength division multiplexers, and combiners. Such components typically have cross sections that are substantially circular or oval-shaped. However, the invention may accommodate other cross sectional arrangements including those that are substantially rectangular or irregular. In accordance with the invention, the modular retainer 100 retains a plurality of optical components in a desired spatial relationship that, when coupled with appropriate optical pathways (such as optical fibers), form an optical circuit. Such optical circuits may include, for example, interleavers, deinterleavers, multiplexers and demultiplexers.

The plurality of upstanding complementary finger pairs extend 130 from the base 110, as shown in FIG. 1. Each finger in the finger pair 130 is provided with an inner and outer surface where the respective opposing inner surfaces define an optical component receiving area that is sized to accommodate an optical component. For example, in the illustrative modular retainer 100 shown in FIG. 1, the optical component receiving area is sized for relatively small optical components such as couplers. The modular retainer 200 shown in FIG. 2 has an optical component receiving area that is sized for relatively large optical components such as mass fusion splices.

Figure 3:
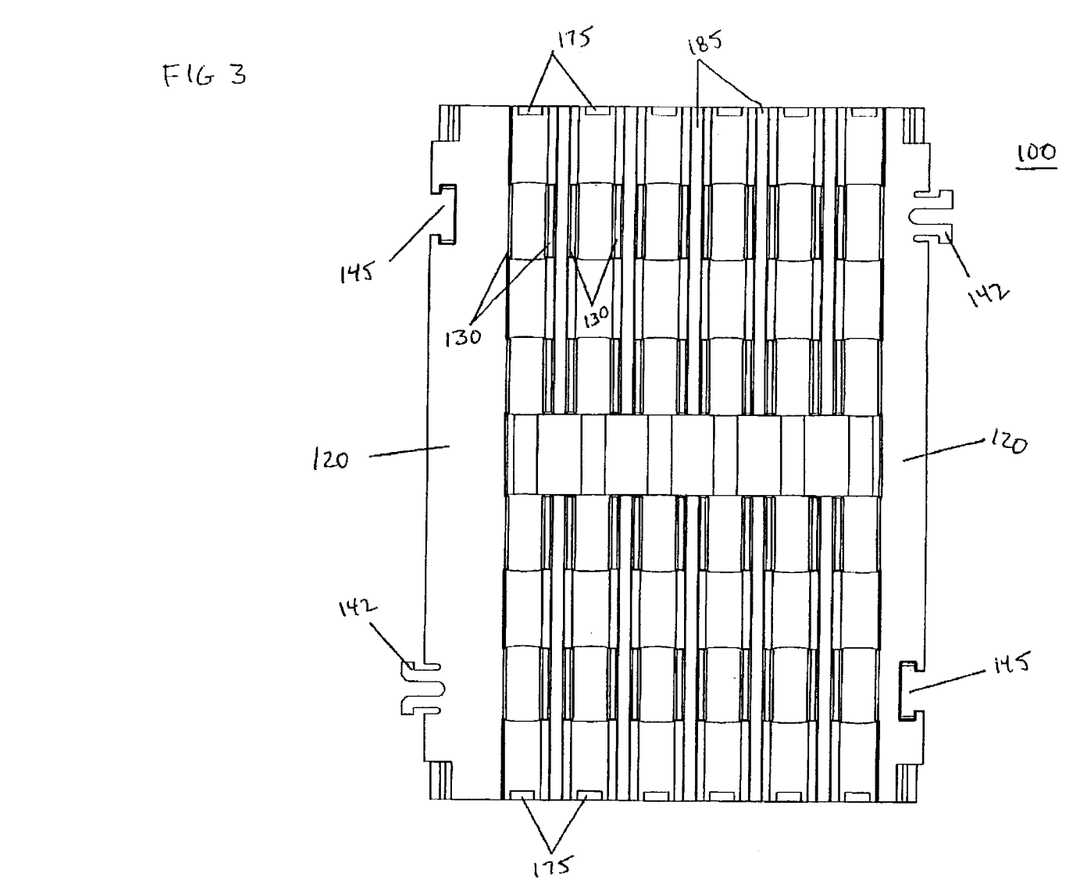
FIG. 3 is a top plan view of the modular, variably configurable retainer for optical components of FIG 1.

Referring now to FIG. 3, a top plan view of the modular retainer 100 is depicted. As shown, the plurality of finger pairs 130 in the illustrative modular retainer 100 are arranged in a 6×4 rectangular array. That is, six columns of fingers pairs 130 are provided in four lateral rows for a total of 24 finger pairs. The 24 finger pairs 130, in accordance with the invention, thereby facilitates the registration of optical components in a desired spatial array to form an optical circuit. Of course, other arrangements of finger pairs 130 are contemplated by the invention including rectangular arrays having other dimensions than that shown in FIG. 3, and non-rectangular arrays. Slots 185 running between adjacent finger pairs 130 accommodate the optical pathways (e.g., optical fibers) used to couple the optical components retained in the modular retainer 100.

Figure 4:
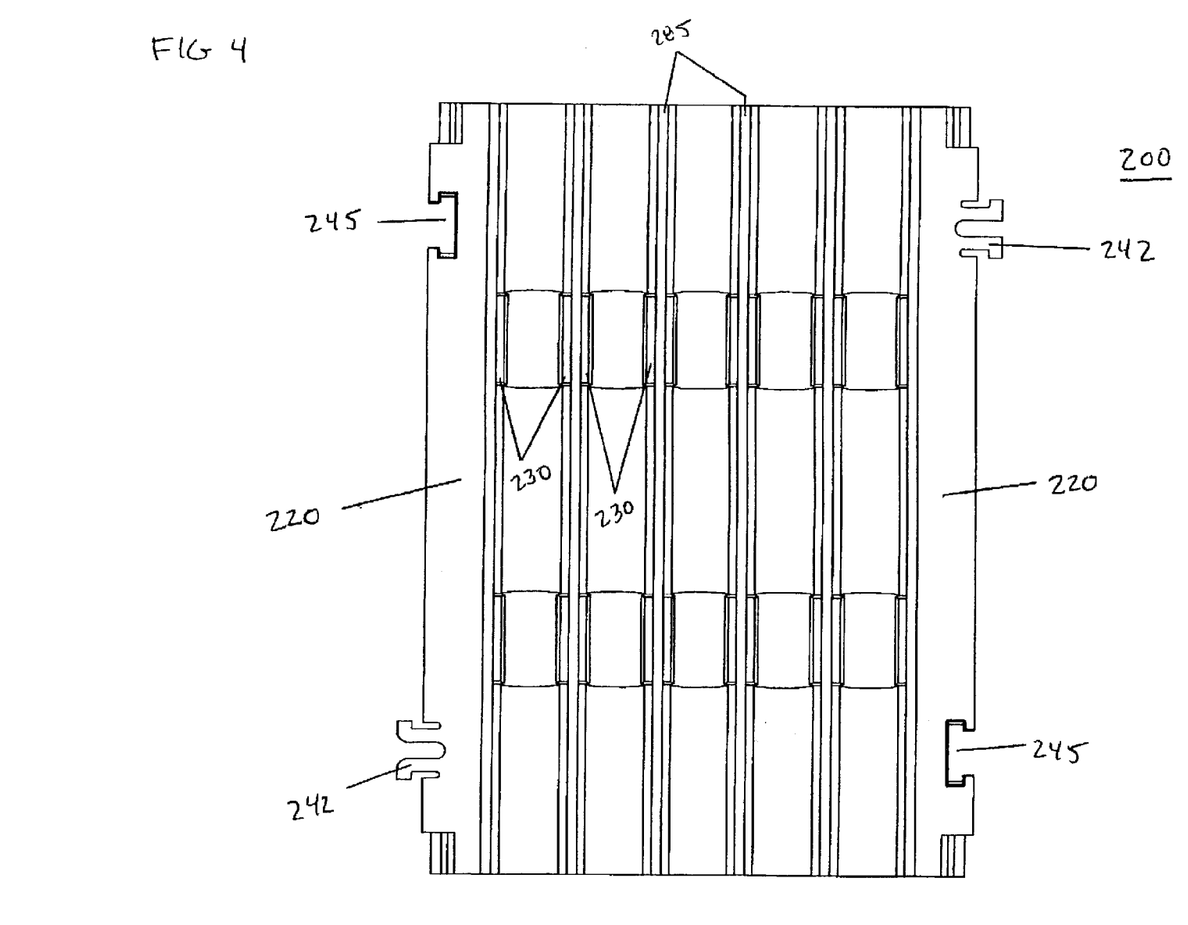
FIG. 4 is a top plan view of the modular, variably configurable retainer for mass fusion splices of FIG. 2.

FIG. 4 shows the top plan view of the modular retainer 200. In this illustrative example, the plurality of finger pairs 230 are arranged in a 5×2 rectangular array. Five columns of fingers pairs 130 are provided in three lateral rows, as shown, for a total of 15 finger pairs. Slots 285 running between adjacent finger pairs 230 accommodate the optical pathways (e.g., optical fibers) used to couple the optical components retained in the modular retainer 200.

Figure 6:
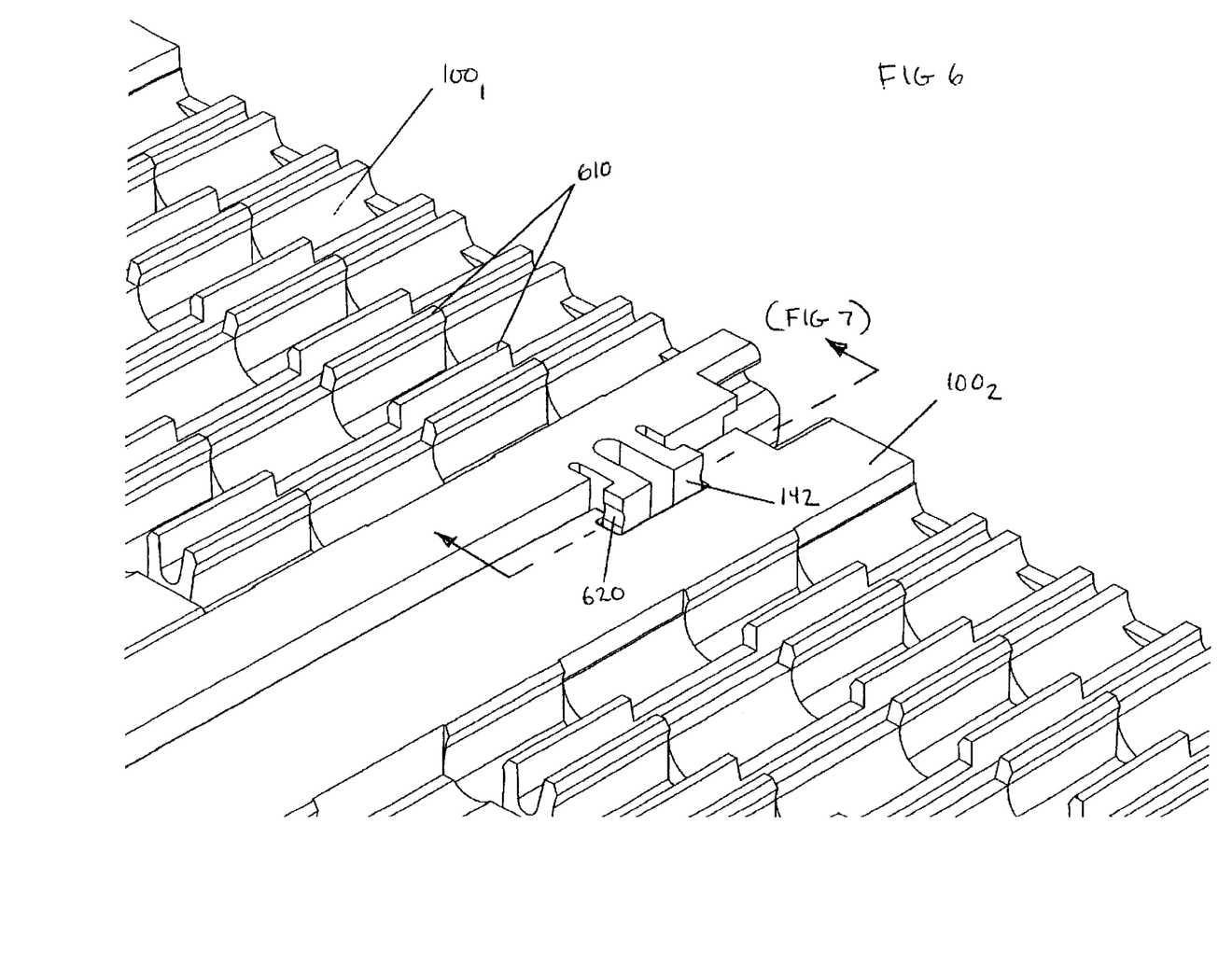
FIG. 6 is close-up detailed view of the tab and slot interconnection in partial slidable engagement between the two modular, variably configurable retainers shown in FIG. 5, in accordance with the invention.

Returning to FIG. 1, each finger pair 130 comprise flexible, laterally biased finger pairs that are normally biased with the inner surfaces urged laterally inwardly and are moveable outwardly for interlockingly engaging an optical component so as to retain the optical component substantially against the support surface 135. The inner surfaces of the finger pairs 130 may optionally be configured to have a concave shape to facilitate retention of the optical component by the finger pairs. As shown in the close-up detailed view of the modular retainer 100 in FIG. 6, a slightly concave rib 610 extends laterally along the inner surface of each finger pair 130 so that each finger pair 130 has facing concave surfaces. As shown in FIG. 6, ribs 610 are provided with a beveled surface disposed between the top and facing inner surfaces of the rib.

The beveled surfaces of ribs 610 provide a contacting area for an optical component being inserted into the modular retainer 100. As the optical component is pushed in the downward direction, the optical component bears against the beveled surfaces of the ribs 610 in the opposing finger pairs 130 to thereby cause the outward (i.e., lateral) spreading force against the finger pair 130. The spreading force causes elastic deformation of the finger pair 130 to cause an outward deflection of the finger pair 130 sufficient to allow the optical component to pass by the beveled surface and down into the receiving area formed the finger pairs 130 and support surfaces 135. As the optical component reaches its maximum downward excursion, the finger pair 130 (being normally inwardly biased) press the opposing concave surfaces of the rib 610 against the optical component to thereby retain the optical component between the finger pair 130 in a snap-fit arrangement. In applications of the invention, the finger pairs 130, support surfaces 135 and ribs 610 may be configured in such a way that the optical component, when inserted into modular retainer 100, is retained substantially against support surface 135.

Advantageously, the concave shaped inner surfaces and the resilient construction of the finger pairs 130 provides secure retention of optical components within modular retainer 100 in the desired spatial relationship. The snap-fit insertion force may be tailored as desired to the specific application of the invention by adjusting the geometry of the beveled surface, the thickness of the finger pairs, the deflection displacement and the material forming the finger pair (to name just a few factors affecting the insertion force) in a conventional manner. In any event, the insertion force may be set to facilitate optical component population within modular retainer 100 by hand or by appropriately-configured automated equipment.

Returning again to FIG. 1, modular retainer 100 includes side structures 120 disposed lengthwise adjacent to, and along the lateral edges of base 110, as shown. The side structures 120 each have a height that is substantially co-extensive with that of the finger pairs 130. In accordance with the invention, therefore, the side structures 120 in combination with finger pair and support surface retention (as described above) provide substantial physical protection to the optical components populated and retained within the modular retainer 100.

Figure 9:
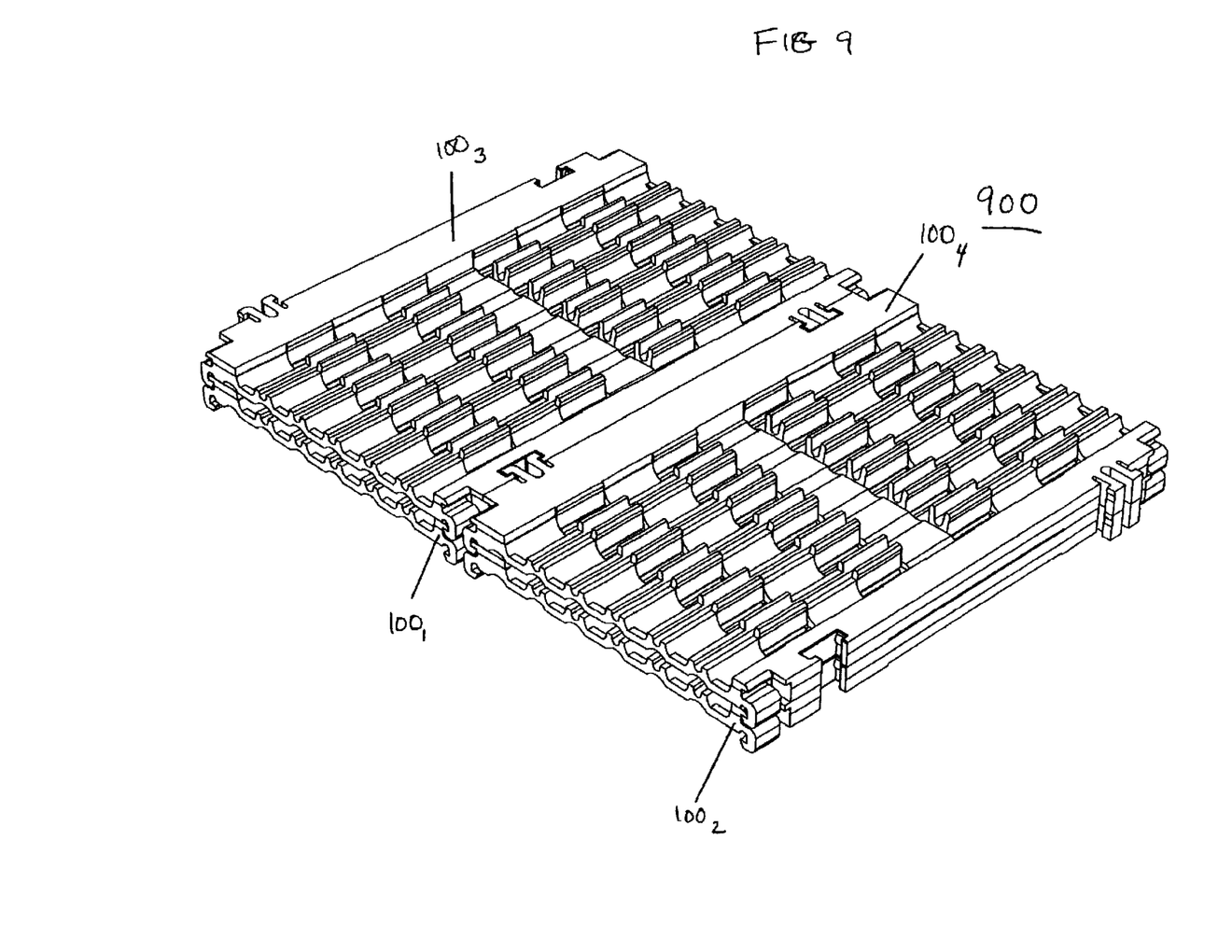
FIG. 9 is a pictorial illustration of a two-by-two matrix of modular optical component retainers, in accordance with the invention.
Figure 10:
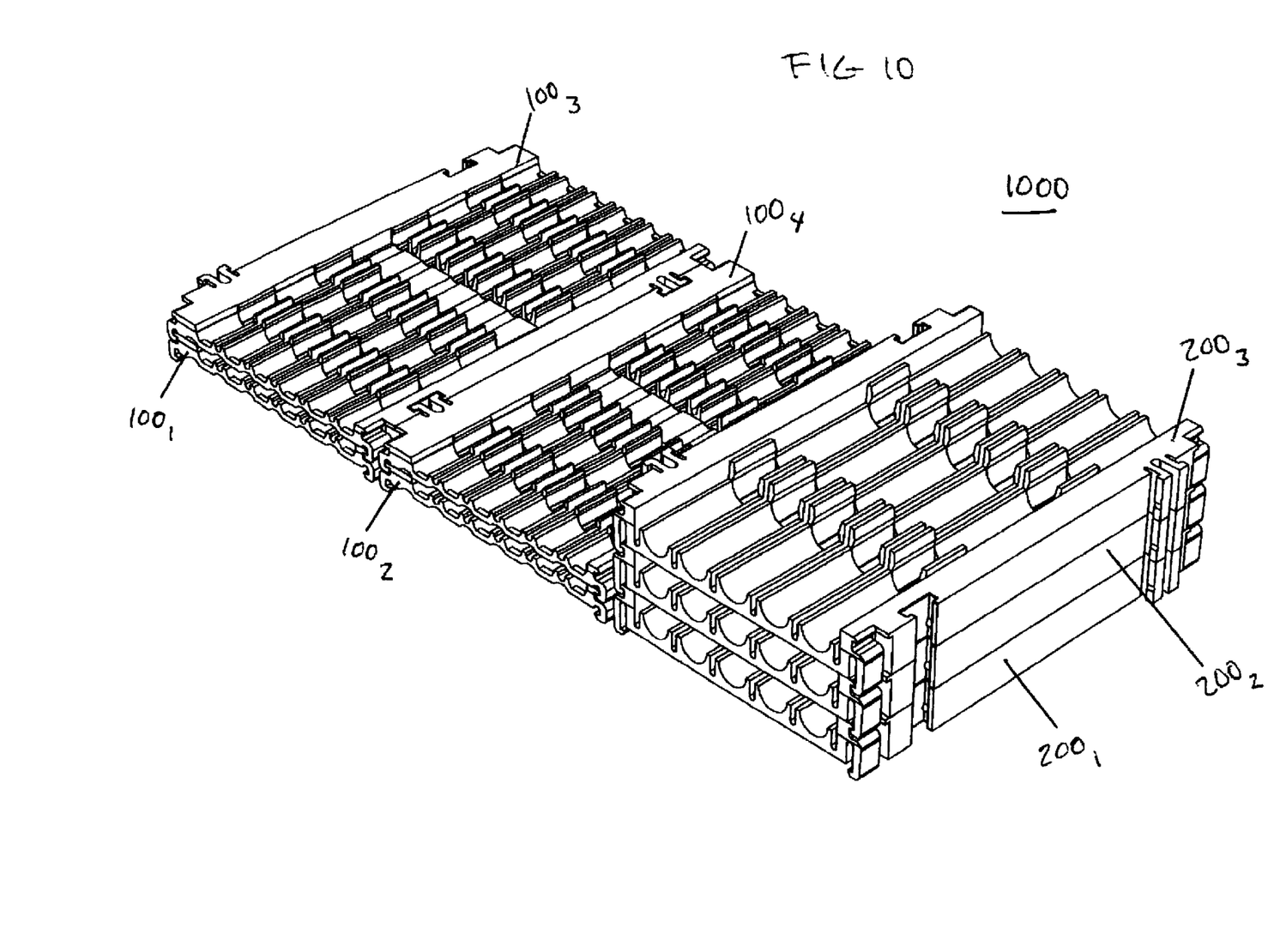
FIG. 10 is a pictorial illustration of a mixed planar and columnar matrix of modular retainers, including four modular retainers arranged for small form factor optical components (such as couplers) and three modular retainers arranged for large form factor optical components (such as mass fusion splices), in accordance with the invention.

The side structures 120 include, in the illustrative example of the invention in FIG. 1, substantially planar top and bottom surfaces to facilitate the stacking of modular retainers 100 in columnar arrays. In addition, the side structures 120 include at least one connective element disposed on the side structure to enable a selectively engagable interconnection with a complementary connective element on an adjacent modular retainer 100 when a plurality of modular retainers are configured in a variably configurable planar array. FIGS. 9 and 10 illustrative the stacking and planar array features of the invention.

FIG. 9 is a pictorial illustration of an assembly of modular retainers 100 comprising a 2×2 matrix 900, in accordance with the invention. As shown, modular retainers $100_1$ and $100_2$ are arranged in a planar arrangement forming the first row of the matrix and modular retainers $100_3$ and $100_4$ are arranged in a second row. The first and second rows are stacked, as shown in FIG. 9, to form two columns. Thus, a matrix of two planar rows and two stacked columns are formed by the four modular retainers $100_{1-4}$. As described in detail below, the modular retainers $100_{1-4}$ are interconnected in the 2×2 matrix 900 using snap-fit connective elements.

FIG. 10 is a pictorial illustration of a mixed planar and columnar matrix of modular retainers, including four modular retainers $100_{1-4}$ and three modular retainers $200_{1-3}$, in accordance with the invention. The four modular retainers 1001–4 are arranged as shown in FIG. 9. The three modular retainers $200_{1-3}$ are stacked in three-high column. Modular retainers $100_2$ and $100_4$ are coupled along their lateral edges to modular retainer $200_1$ in a selectively engagable interconnection. It is noted that, in accordance with the invention, that modular retainers $100_2$ and $100_4$ are selectively engaged with a single modular retainer 2001. As described above, the modular retainer 200 may be arranged to have twice the height of modular retainer 100. Thus, a tab 242 is simultaneously slid into the mating slots 145 of both modular retainers $100_2$ and $100_4$. Similarly, the tabs 142 on each modular retainer $100_2$ and $100_4$ are engaged within the single mating slot 245 in modular retainer $200_1$.

Returning to FIG. 1, a pair of complementary interconnects are disposed on the side structures 120 where each complementary interconnect includes a male side structure 142 and a female side structure 145. The male side structure 142 includes a interlocking tab that extends laterally from the side structure 120. The female side structure include a mating slot 145 that is arranged to mate with an interlocking tab of an adjacent modular retainer (when one or more modular retainers 100 are arranged in a planar array) in a selectively engagable interconnection. In the illustrative modular retainer 100 shown in FIG. 1, each side structure 120 includes one interlocking tab and one mating slot in a staggered interconnection arrangement. In many applications of the invention, such arrangement may preferably provide enhanced robustness of the interconnection between adjacent modular retainers. However, in other applications, it may be desirable to include a different number of connectors in either staggered or non-staggered configurations.

In many applications of the invention, it may be preferable to form the base 110, finger pairs 130 and side structures 120 with interconnects 142 and 145 as a unitary (i.e., monolithic) structure. Such a unitary structure is typically formed using an injected molded thermoplastic resin. Polycarbonate thermoplastic is readily formable and has exceptional strength and toughness. However, other thermoplastics may be utilized as well as thermosetting materials.

Figure 5:
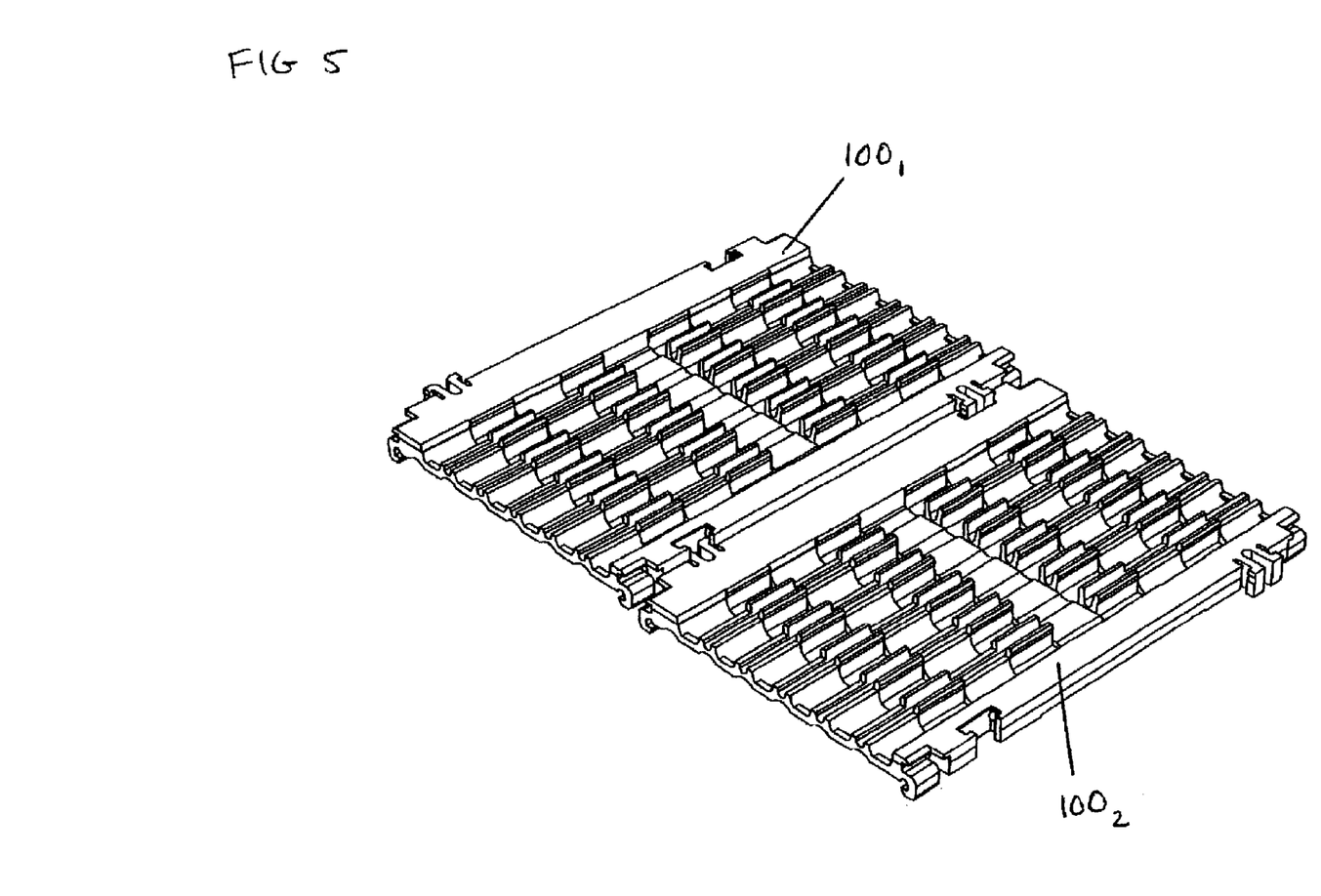
FIG. 5 is a pictorial view of two modular, variably configurable retainers in partial slidable engagement.
Figure 7:
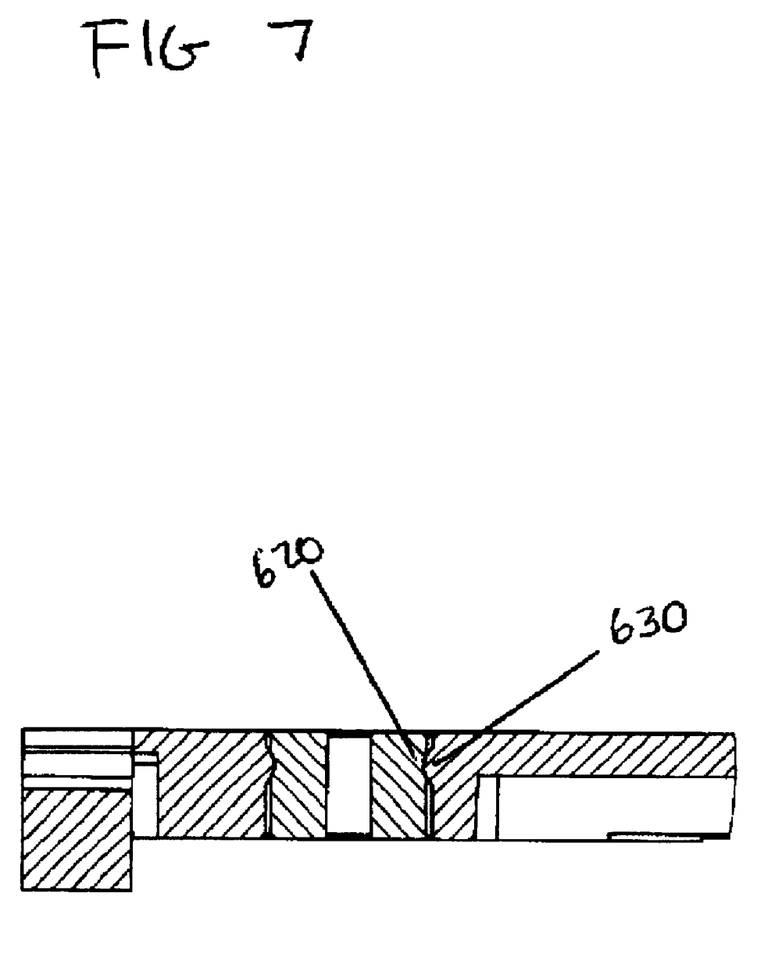
FIG. 7 is a cross sectional and detailed view of the tab and slot interconnection of FIG. 6 shown in full slidable engagement that permits the assembly of the modular retainer in a planar array, in accordance with the invention.

Referring now to FIG. 5, two modular retainers $100_1$ and $100_2$ are shown in partial slidable engagement. In accordance with the invention, the interlocking tab 142 and mating slot 145 slidably engage along a vertical plane. FIG. 6 is a detailed close-up view of the slidably engagement of the interlocking tab and mating slot 145 in partial slidable engagement. A matching lug 630 and recess 620 are disposed respectively in the adjoining connective slot and tab which are used to provide snap-fit vertical registration of adjacent modular retainers $100_1$ and $100_2$ when fully slidably engaged. FIG. 7 is a sectional view (taken along the section lines shown in FIG. 6) which shows the matching lug 630 and recess 620.

Figure 8:
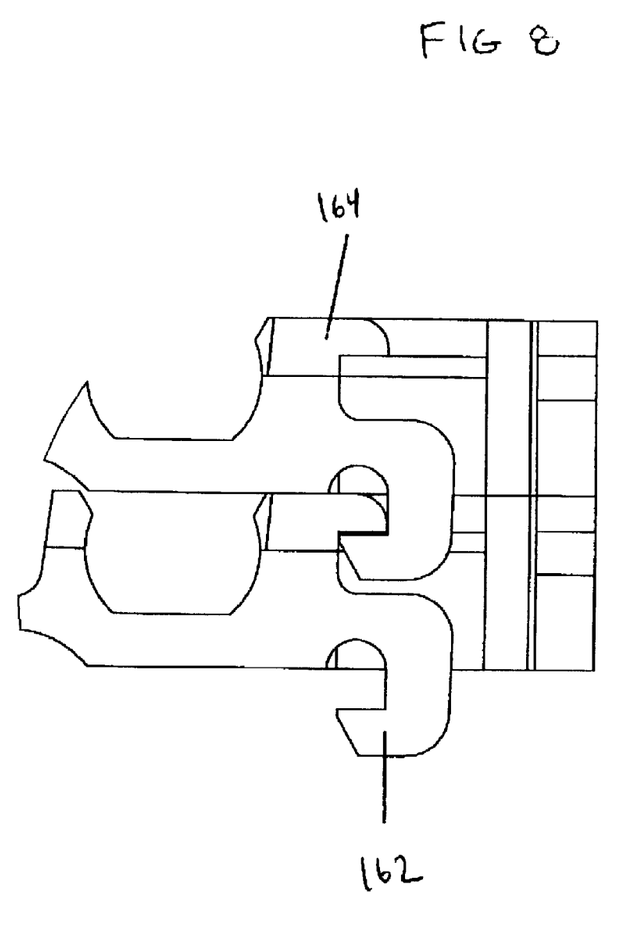
FIG. 8 is a close-up detailed view of the hook and catch interconnection that permits the assembly of the modular retainer in a stacked columnar array, in accordance with the invention.

FIG. 8 shows details of an interconnect that is provided to facilitate the assembly of illustrative modular retainers shown in FIGS. 1 and 2 into stacked columnar arrays. The interconnect comprises first and second members having complementary-shaped facing portions. In the modular retainer 100, the first member 162 is hooked shaped and project downward from the base 110, or as shown in FIG. 1, the first member extends downward from the side structure 120. The complementary-shaped second member 164 is formed on the top of the base 110, or as shown in FIG. 1, is disposed on the top of the side structure 120.

As shown in FIG. 8, second member 164 as a radiused surface disposed between the top surface and a laterally extending catch having an bottom facing planar surface. The bottom facing planar surface is complementary to an upward facing planar surface on the hooked-shaped first member 162. As a modular retainer is positioned above an adjacent retainer to create a stacked columnar array, a beveled surface of the hooked-shaped first member contacts the radiused surface of the catch of the second member thereby causing the first member 162 to elastically deflect outward as the modular retainers are pushed together in an upward and downward motion. The hook-shaped first member then snaps into place underneath the second member whereby the upward and downward facing planar surfaces of the hook and catch, respectively, are placed in intimate contact.

Other embodiments of the invention may be implemented in accordance with the claims that follow.

What is claimed is:

1. A modular retainer assembly, comprising a plurality of optical component retainers, each retainer comprising:
a substantially planar base;
upstanding complementary finger pairs extending from the base, and
wherein each finger in the finger pair is provided with an inner and outer surface, the respective opposing inner surfaces defining an optical component receiving area that is sized to accommodate an optical component, each finger pair comprising flexible laterally biased finger pairs being normally biased with the inner surfaces urged laterally inwardly and being moveably outwardly for interlockingly engaging an optical component so as to retain the optical component in a snap-fit manner;
side structures disposed adjacent to the base; and
at least one connective element disposed on the side structures for forming a selectively engagable interconnection with a complementary connective element on an adjacent retainer in the modular retainer assembly thereby to configure the modular retainer assembly in a variably configurable array, wherein the fingers are arranged in a substantially rectangular grid and the side structures extend longitudinally along the base and parallel to the grid.

2. The modular retainer assembly of claim 1 wherein the base includes an optical component support surface and the finger pairs are arranged to retain the optical component substantially against the support surface.

3. The modular retainer assembly of claim 1 wherein the at least one connective element comprises a plurality of connective elements, each element having a first and secondary complementary members.

4. The modular retainer assembly of claim 3 wherein the first complementary members are disposed in a staggered configuration on respective side structures.

5. The modular retainer assembly of claim 1 wherein the fingers are arranged to register optical components within a substantially planar spatial array that thereby facilitates interconnection of the optical components as an optical circuit.

6. The modular retainer assembly of claim 1 wherein the base is substantially rectangular in plan.

7. The modular retainer assembly of claim 1 wherein the side structure, fingers, interconnectors are integrally formed with the base in a unitary structure.

8. The modular retainer assembly of claim 7 wherein the unitary structure is formed from a thermoplastic material using an injection molding process.

9. The modular retainer assembly of claim 8 wherein the thermoplastic material is polycarbonate.

10. The modular retainer assembly of claim 1 wherein the grid is arranged as M×N rectangular array.

11. The modular retainer assembly of claim 1 wherein the modular retainer is arranged to be stackable.

12. The modular retainer assembly of claim 1 wherein the optical component is a coupler.

13. The modular retainer assembly of claim 1 wherein the optical component is a mass fusion splice.

14. The modular retainer assembly of claim 1 wherein the optical component is an isolator.

15. The modular retainer assembly of claim 1 wherein the optical component is a wavelength division multiplexer.

16. The modular retainer assembly of claim 1 wherein the optical component is a combiner.

17. The modular retainer assembly of claim 1 wherein the modular retainer retains a plurality of optical components in a spatial relationship to form an optical circuit.

18. The modular retainer assembly of claim 17 wherein the optical circuit is an interleaver.

19. The modular retainer assembly of claim 17 wherein the optical circuit is a deinterleaver.

20. The modular retainer assembly of claim 17 wherein the optical circuit is a multiplexer.

21. The modular retainer assembly of claim 17 wherein the optical circuit is a demultiplexer.

22. A modular retainer assembly, comprising a plurality of optical component retainers, each retainer comprising:
a substantially planar base;
upstanding complementary finger pairs extending from the base, and
wherein each finger in the finger pair is provided with an inner and outer surface, the respective opposing inner surfaces defining an optical component receiving area that is sized to accommodate an optical component, each finger pair comprising flexible laterally biased finger pairs being normally biased with the inner surfaces urged laterally inwardly and being moveably outwardly for interlockingly engaging an optical component so as to retain the optical component in a snap-fit manner;
side structures disposed adjacent to the base; and
at least one connective element disposed on the side structures for forming a selectively engagable interconnection with a complementary connective element on an adjacent retainer in the modular retainer assembly thereby to configure the modular retainer assembly in a variably configurable array;
stops disposed at the periphery of the base and in line with a center line of the opposing fingers to prevent excessive axial movement of an optical element once retained by the fingers against the base.

23. The modular retainer assembly of claim 22 wherein the base includes an optical component support surface and the finger pairs are arranged to retain the optical component substantially against the support surface.

24. The modular retainer assembly of claim 22 wherein the at least one connective element comprises a plurality of connective elements, each element having a first and secondary complementary members.

25. The modular retainer assembly of claim 24 wherein the first complementary members are disposed in a staggered configuration on respective side structures.

26. The modular retainer assembly of claim 22 wherein the fingers are arranged to register optical components within a substantially planar spatial array that thereby facilitates interconnection of the optical components as an optical circuit.

27. The modular retainer assembly of claim 22 wherein the base is substantially rectangular in plan.

28. The modular retainer assembly of claim 22 wherein the side structure, fingers, interconnectors are integrally formed with the base in a unitary structure.

29. The modular retainer assembly of claim 28 wherein the unitary structure is formed from a thermoplastic material using an injection molding process.

30. The modular retainer assembly of claim 29 wherein the thermoplastic material is polycarbonate.

31. The modular retainer assembly of claim 22 wherein the modular retainer is arranged to be stackable.

32. A method of assembling a planar array of modular optical component retainers, the method comprising the steps of:
providing a modular retainer comprising a substantially planar base, upstanding fingers extending from the base, each having a inner and outer surface, the respective inner surfaces defining an optical component receiving area that is sized to accommodate an optical component and side structures disposed adjacent to the base including at least one male side structure and at least one opposing female side structure, the male side structure and female side structure for forming a selectively engagable interconnection with an adjacent retainer to thereby configure the modular retainer assembly in variable planar array arrangements;
positioning the side structures of another modular retainer in proximity to corresponding side structure on the modular retainer in a side-by-side planar arrangement so that a male side structure of the other modular retainer is received by the corresponding female side structure of the modular retainer; and
slidably engaging the side structures to secure the modular retainers into the planar array.

33. A planar array of modular optical component retainers, comprising:
at least first and second modular retainers, each of said modular retainers comprising a substantially planar base, upstanding fingers extending from the base, each having a inner and outer surface, the respective inner surfaces defining an optical component receiving area that is sized to accommodate an optical component and side structures disposed adjacent to the base including at least one male side structure and at least one opposing female side structure, the male side structure and female side structure being configured to form a selectively engagable interconnection with an adjacent retainer to thereby configure the modular retainer assembly in variable planar array arrangements;
wherein the side structures of the first modular retainer are slidably engaged with the side structures of the second modular retainer to secure the modular retainers into the planar array.

34. The planar array of modular optical component retainers of claim 33 wherein the base of each modular retainer includes an optical component support surface and the finger pairs are arranged to retain the optical component substantially against the support surface.

35. The planar array of modular optical component retainers of claim 34 wherein the male side structure includes an interlocking tab extending laterally from the male side structure and the female side structure includes a mating slot arranged to mate with an interlocking tab of an adjacent retainer in selectively engagable interconnection therewith.

36. The planar array of modular optical component retainers of claim 33 wherein the fingers of each modular retainer are arranged to register optical components within a substantially planar spatial array that thereby facilitates interconnection of the optical components as an optical circuit.

37. The planar array of modular optical component retainers of claim 33 wherein the base of each modular retainer is substantially rectangular in plan.

38. The planar array of modular optical component retainers of claim 33 wherein the side structure, fingers, interconnectors of each modular retainer are integrally formed with the base in a unitary structure.

39. The planar array of modular optical component retainers of claim 38 wherein the unitary structure is formed from a thermoplastic material using an injection molding process.

40. The planar array of modular optical component retainers of claim 39 wherein the thermoplastic material is polycarbonate.

41. The planar array of modular optical component retainers of claim 33 wherein each of the modular retainers is arranged to be stackable.

42. The planar array of modular optical component retainers of claim 33 wherein each modular retainer further includes stops disposed at the periphery of the base and in line with a center line of the opposing fingers to prevent excessive axial movement of an optical element once retained by the fingers against the base.

* * * * *

UNITED STATES PATENT AND TRADEMARK OFFICE
CERTIFICATE OF CORRECTION

PATENT NO. : 6,701,056 B2
DATED : March 2, 2004
INVENTOR(S) : Denis Edward Burek et al.

It is certified that error appears in the above-identified patent and that said Letters Patent is hereby corrected as shown below:

Column 2,
Line 26, before "resilient", change "an" to -- a --..
Line 63, before "substantially", delete "a".
Line 64, before "oval", delete "a".
Line 65, change "section" to -- sections --.

Column 3,
Line 28, change "time" to -- times --.

Column 4,
Line 61, before "an", change "in" to -- is --.

Column 5,
Line 39, after "thereby", change "facilitates" to -- facilitate --.

Column 6,
Line 14, after "formed" insert -- by --.
Line 17, change "press" to -- presses --.
Line 57, change "illustrative" to -- illustrate --.

Column 7,
Line 8, change "1001-4" to -- 100$_{1-4}$ --.
Line 9, before "three-high", insert -- a --.
Line 14, after "retainer", change 2001 to -- 200$_1$ --.
Line 26, after "structure", change "include" to -- includes --.
Line 51, change "slidably" to -- slideable --.
Line 67, before "downward" change "project" to -- projects --.

Column 8,
Line 5, after "164", change "as" to -- has --.
Line 7, before "bottom", change "an" to -- a --.
Line 33, after "being", change "moveably" to -- moveable --.
Line 53, before "first", delete "a".
Line 66, before "interconnectors", insert -- and --.

Column 9,
Line 7, before "MxN", insert -- a --.
Line 42, after "being", change "moveably" to -- moveable --.
Line 63, before "first", delete "a".

UNITED STATES PATENT AND TRADEMARK OFFICE
CERTIFICATE OF CORRECTION

PATENT NO.   : 6,701,056 B2
DATED        : March 2, 2004
INVENTOR(S)  : Denis Edward Burek et al.

It is certified that error appears in the above-identified patent and that said Letters Patent is hereby corrected as shown below:

Column 10,
Line 9, "interconnectors", insert -- and --.
Line 34, after "side", change "structure" to -- structures --.

Column 11,
Line 14, before "interconnectors", insert -- and --.

Signed and Sealed this

Tenth Day of August, 2004

JON W. DUDAS
*Acting Director of the United States Patent and Trademark Office*